UNITED STATES PATENT OFFICE.

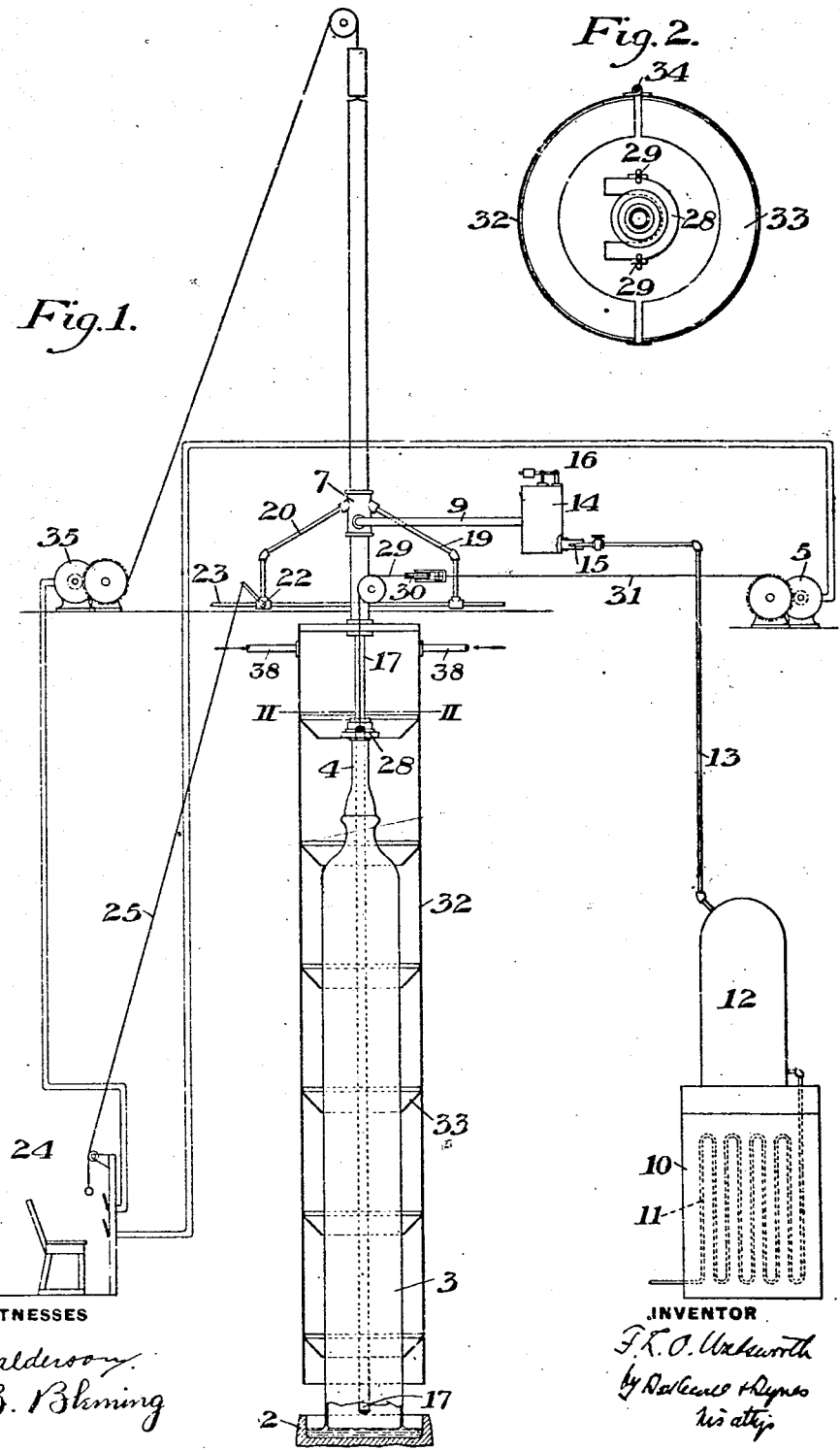

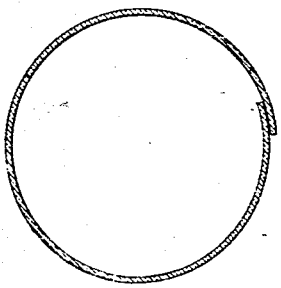
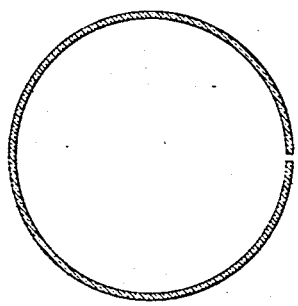
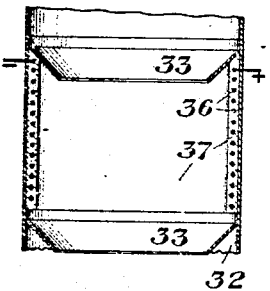
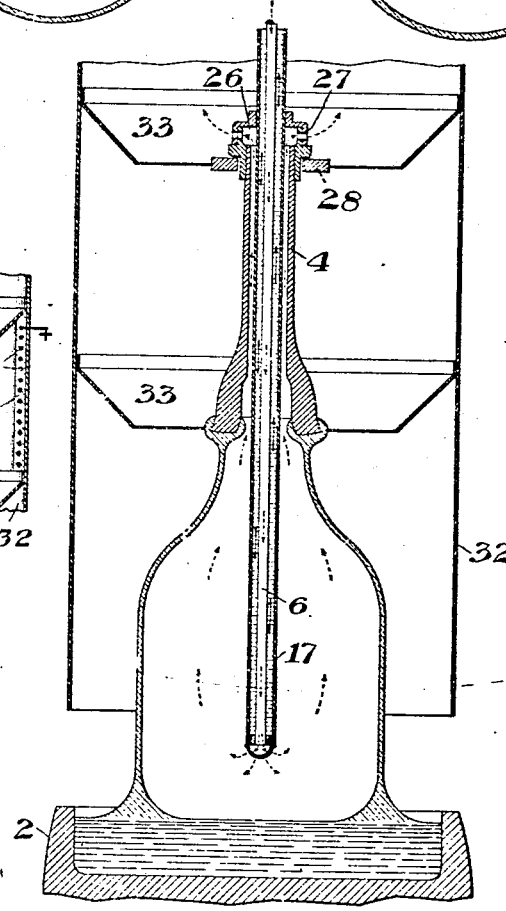
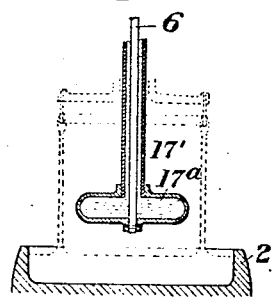

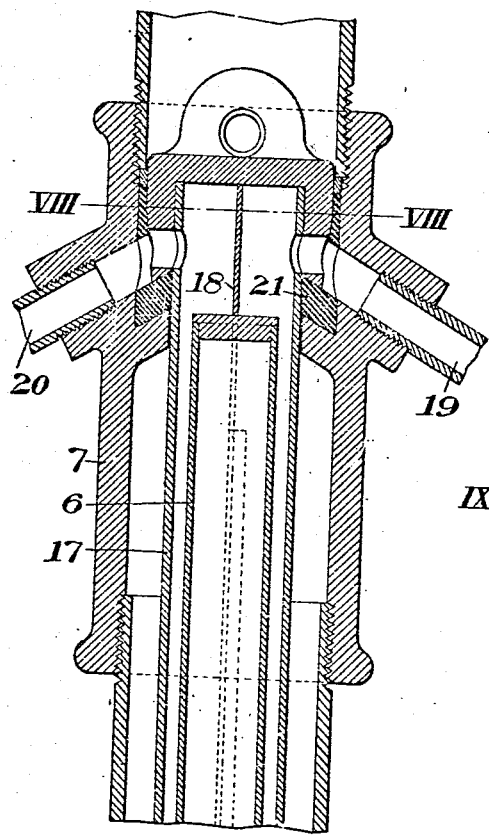
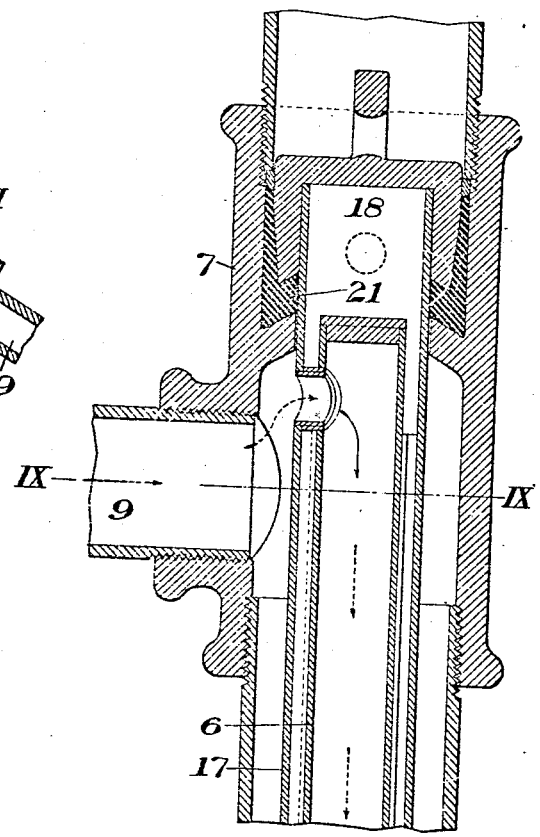
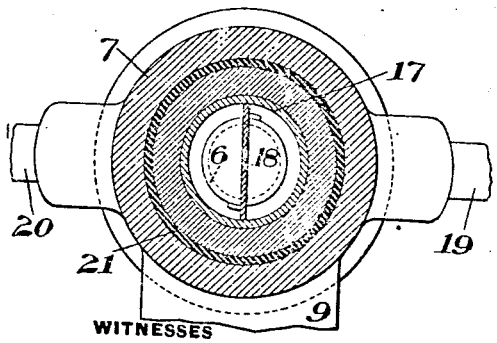
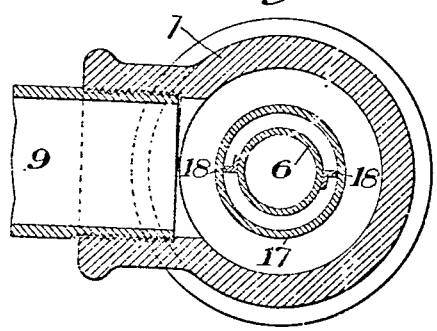

FRANK L. O. WADSWORTH, OF SEWICKLEY, PENNSYLVANIA, ASSIGNOR TO WINDOW GLASS MACHINE COMPANY, OF PITTSBURG, PENNSYLVANIA, A CORPORATION OF NEW JERSEY.

DRAWING HOLLOW GLASS ARTICLES.

985,866.   Specification of Letters Patent.   Patented Mar. 7, 1911.

Application filed August 2, 1906. Serial No. 328,833.

*To all whom it may concern:*

Be it known that I, FRANK L. O. WADSWORTH, of Sewickley, Allegheny county, Pennsylvania, have invented a new and useful Improvement in Drawing Hollow Glass Articles, of which the following is a full, clear, and exact description, reference being had to the accompanying drawings, forming part of this specification, in which—

Figure 1 is an elevation largely diagrammatic of one form of apparatus embodying my invention; Fig. 2 is a section on the line II—II of Fig. 1; Fig. 3 is a sectional view on an enlarged scale illustrating the drawing operation; Figs. 4 and 5 are comparative sectional views of a drawn glass cylinder showing the results obtained by my invention; Figs. 6 and 7 are vertical sections taken in planes at right angles to each other through the supply head and telescope casing; Fig. 8 is a section on the line VIII—VIII of Fig. 6; Fig. 9 is a section on the line IX—IX of Fig. 7; and Figs. 10 and 11 are modifications.

My invention has relation to drawing hollow glass articles, and is designed to provide a novel method and means whereby a drawn glass article may be produced, having the same physical characteristics at its inner and outer portions. In the operation of drawing hollow glass articles as heretofore generally practiced, this result has not been obtained by reason of the fact that the air introduced by the blow pipe into the interior of the article is not capable of cooling the interior of the article to the same extent that its exterior is cooled. As a result of this, the glass in the bath from which the article is drawn is cooler at the exterior than at the interior, so that the glass is not drawn under uniform tension at both the interior and exterior portions of the article. That is to say, a larger mass or meniscus of glass is drawn out of the bath at the outer circumference of the article than at the inner circumference. This results in a distortion of the drawn article, and also in the production of strains therein both while it is being drawn and while it is cooling which weaken the cylinder and also cause it, when split for flattening, to lap in the manner illustrated in Fig. 4 of the drawing. This is an extremely objectionable feature which results in the loss of a considerable percentage of the drawn articles.

The object of my invention is to overcome the difficulties above referred to, and to provide a method and means whereby the articles may be drawn under approximately uniform conditions at both their interior and exterior portions; and to this end my invention consists in providing a method and means for equalizing the temperature at the inner and outer portions of the article being drawn. This is effected in part by chilling the glass at the interior of the article being drawn, and in part by retarding the cooling of the exterior portion of the article, these two features being preferably combined, although either one may be used of itself with good results.

My invention also consists in the novel steps and in the novel features of construction, arrangement and combination of apparatus hereinafter described and pointed out in the appended claims.

In the drawings, the numeral 2 designates a pot or vessel from which the hollow article, such as the cylinder 3 is drawn upwardly by means of the blow pipe and bait 4 operated by the motor 5 or any other suitable means.

6 designates an air supply pipe which extends downwardly from a supply head 7 through the blow pipe and bait to a point preferably a short distance above the surface of the glass in the drawing pot or vessel 2. This pipe receives its air supply from a pipe 9 which communicates therewith through the head 7. The air supply to this pipe is furnished by a compressor to a refrigerating apparatus 10 from the cooling coils 11, of which it passes into a reservoir 12 and thence by a pipe 13 to an expansion chamber 14. The pipe 13 communicates with the expansion chamber 14 by means of a nozzle 15, and the air escaping from this nozzle under the high pressure at which it is furnished by the compressor is further cooled by this expansion.

16 designates a safety valve or blow off for the expansion chamber 14.

17 designates a water pipe which extends telescopically through the head 7 and which, in the arrangement shown, surrounds the air pipe 6, although this is not essential.

This pipe is provided with an internal transverse vertical partition 18, which extends to within a short distance of the lower end of the pipe and provides a water circulating passage whose upper end portions communicate with circulating pipes 19 and 20 through the head 7.

21 is a gasket or packing for the pipe 17 within the head 7.

22 is a three-way controlling valve by means of which the water from the supply pipe 23 can be circulated through the pipe 17 by way of pipes 19 and 20, or it can be moved to a position to drain the inlet circulating pipe 20. This valve may be arranged as shown so as to be operated or controlled from the operator's station 24 by means of a suitable operating connection such as indicated at 25.

26 is a hollow blow pipe head secured to the upper end of the blow pipe and bait 4 and which is provided with a perforated adjustable cap 27, the perforations of which may be brought wholly or in part into alinement with corresponding perforations in the body portion of the head to thereby control the escape of air from the interior of the article being drawn, such air passing upwardly around the water pipe 17 in the arrangement shown.

28 designates the carrier for the blow pipe and bait to which I attach the operating cables 29. These two cables 29 are united by an equalizing pulley 30 which is connected to the motor 5 by the cable 31. By the provision of the two cables 29 an even pull from the two sides of the cylinder is insured without the use of guides or other means for the purpose.

32 designates a circular hood or shield concentrically arranged to surround the cylinder while it is being drawn. This shield or hood is formed with a series of internal horizontal baffles 33 which serve to retard the upward passage of the hot air and gases from the drawing pot, said shield thereby largely preventing the escape of heat from the exterior of the article being drawn either by radiation or convection. The hood or shield 32 is formed in sections as shown in Fig. 2, connected by hinges 34 so that the front section may be swung outwardly to permit the removal of the drawn cylinder. The baffles 33 are secured to the sections of the shield and are also constructed in sections as shown in said figure.

35 designates a suitable motor and gear by means of which the air supply and water pipes 6 and 17 may be drawn upwardly through the bait and blow pipe at the completion of the drawing operation to permit the ready removal of the latter.

During the drawing operation a continuous supply of the refrigerated air is supplied to the interior of the article at a constant level, and a continuous circulation of water is also maintained through the pipe 17. The effect of this is to cause the removal of a considerable portion of the heat of the bath at the interior of the article and also to chill or cool the interior surface of the article as it is drawn by reason of the circulation of the cold air therein. The water in the pipe 17, together with the pipe itself, forms an efficient conducting means for carrying away this heat and effects a considerable lowering of the temperature at the surface of the bath of glass within the cylinder. At the same time, the surrounding hood or shield 32, with its series of baffles, prevents largely the escape of heat at the exterior of the article, and thereby maintains a surrounding atmosphere or a temperature which approximates as near as may be the temperature at the interior of the article. The combined effect of the interior chilling and the retardation of exterior cooling is therefore to equalize the physical conditions at both the interior and exterior surfaces of the cylinder during the drawing operation, and enables the production of a hollow drawn article which is of uniform thickness, and which is free from strains. As a result of this when the cylinder is cracked open for flattening, it will separate as shown in Fig. 5 without the objectionable overlapping of the edges indicated in Fig. 4. This effects a large saving in the percentage of breakage.

As a further means for retarding the exterior chilling of the article by radiation and convection, I may in some cases fill the space between the shield 32 and the article being drawn by an artificially heated medium. This may be accomplished conveniently as shown in Fig. 10 by lining the interior of the shield with coils of wire 36 embedded in an insulating lining of asbestos or other suitable material 37 and through which a current of electricity may be passed at will; or in other cases by introducing a current or jet of live steam or gas into the shield at its upper end through pipes 38.

The rapidity of the interior chilling may be increased in some cases by expanding the lower end of the water pipe 17' into a head 17ª as shown in Fig. 11. In this case the bait is preferably made in the form of an expanded ring of the construction for example specified in my application No. 306,524, filed March 17th, 1906.

Instead of supplying refrigerated air to the interior of the article as hereinbefore described, I may supply some other fluid of low temperature and high specific heat such as carbonic acid gas or ammonia gas, such gas being preferably passed through an expansion chamber, such as that indicated at 14 before passing to the interior of the article. The use of these or similar gases is advantageous owing to the fact that their high specific heat and low temperature makes them efficient agents for the carrying away of the heat from the bath.

As hereinbefore stated, while I prefer to combine the features of internal chilling and retardation of external cooling, either one of these features may be employed by itself with beneficial results.

It will be obvious to those skilled in the art that various changes may be made in the construction and arrangement of the apparatus employed in the practice of my invention, without departing from the spirit and scope of my invention, since

What I claim is:—

1. In the manufacture of hollow glass articles, the method which consists in drawing the article from a bath of molten glass, and equalizing the physical conditions of temperature, radiation and draft along the interior and exterior surfaces of the article during the drawing operation; substantially as described.

2. In the manufacture of hollow glass articles, the method which consists in drawing the article from a bath of molten glass, and equalizing the temperature of the surface of the glass along the interior and exterior of the article during the drawing operation; substantially as described.

3. In the manufacture of hollow glass articles, the method which consists in drawing the article from a bath of molten glass and chilling the interior portion of the article, and retarding the cooling of the exterior portion of the article during the drawing operation; substantially as described.

4. In the manufacture of hollow glass articles, the method which consists in drawing the article from a bath of molten glass and during the drawing operation supplying the entire interior of the article with an artificially-cooled fluid; substantially as described.

5. In the manufacture of hollow glass articles, the method which consists in drawing the article from a bath of molten glass, and during the drawing operation supplying the interior of the article with a fluid at low temperature as compared with the glass article and capable of absorbing and carrying off heat; substantially as described.

6. In the manufacture of hollow glass articles, the method which consists in drawing the article from a bath of molten glass, and during the drawing operation exposing the interior of the article to the action of an artificially cooled fluid; substantially as described.

7. In the manufacture of hollow glass articles, the method which consists in drawing the article from a bath of molten glass, and during the drawing operation exposing the entire interior surface of the article throughout its length to the combined effect of a cooling liquid and gas; substantially as described.

8. The method of drawing hollow glass articles which comprises introducing a fluid within the article so as to circulate therethrough in a vertical direction, and cooling the fluid before entry, substantially as described.

9. In the manufacture of hollow glass articles, the method which consists in drawing the article from a bath of molten glass and during the drawing operation retarding the escape of heat from the exterior of the article around its entire circumference and for the major portion of its length by convection and radiation; substantially as described.

10. In the manufacture of hollow glass articles, the method which consists in drawing the article from a bath of molten glass, and during the drawing operation, equalizing the external temperature conditions by symmetrically retarding the loss of heat from the entire exterior of the article around its entire circumference and for the major portion of its length; substantially as described.

11. The method of drawing a hollow glass article from a molten mass, and meantime uniformly retarding the cooling of the entire outer surface along at least the major portion of its entire length.

12. Glass drawing apparatus having means for chilling the interior portion of the article being drawn and for retarding the cooling of its exterior portion; substantially as described.

13. Glass drawing apparatus having an air passage arranged to extend to the interior of the article being drawn, and means for refrigerating the air supply to said passage; substantially as described.

14. In glass drawing apparatus, a glass pot, means for drawing a hollow glass article therefrom, means for supplying air to the interior of the article being drawn, and means for refrigerating the air; substantially as described.

15. Glass drawing apparatus having an air passage arranged to extend to the interior of the article being drawn and to open into the interior of the article, and means for continually supplying thereto a fluid of low temperature as compared with the article and capable of absorbing and carrying off heat; substantially as described.

16. In apparatus for drawing glass, an air passage arranged to extend to the interior of the article being drawn, air refrigerating means, and an expansion chamber intermediate the refrigerating means and the said passage; substantially as described.

17. In apparatus for drawing glass, an air passage arranged to extend within the interior of the article to be drawn, a water chamber or passage surrounding the air passage, and means for effecting a circulation through the water chamber or passage; substantially as described.

18. In an apparatus for drawing glass, a glass pot, means for drawing a hollow glass article upwardly therefrom, a water circulating passage or chamber arranged to extend to a point near the surface of the glass in said pot, and a gas supply pipe arranged to extend within said passage and the article being drawn; substantially as described.

19. In glass drawing apparatus, a bait, gas and liquid circulating pipes extending telescopically through the bait, and means for raising and lowering said pipes; substantially as described.

20. Apparatus for drawing hollow glass articles, having means for retarding the escape of heat by convection and radiation from the exterior portion of the article being drawn around its entire circumference and for at least the major portion of its length, substantially as described.

21. Apparatus for drawing hollow glass articles having a shield or hood arranged to surround the article being drawn and having its walls concentric with such article; substantially as described.

22. Apparatus for drawing hollow glass articles comprising drawing means including the blow-pipe, and a shield surrounding the article adapted to retard the cooling along the entire exterior surfaces throughout the major portion of its length.

23. Glass drawing apparatus having a shield or hood arranged to surround the article being drawn, and formed with a series of internal horizontally-arranged baffles for retarding the escape of heat by convection; substantially as described.

24. In glass drawing apparatus, a bait, a carrier therefor, and equalizing hoisting connections attached to said carrier at opposite points whereby to balance the same on its supports and avoid twisting strains; substantially as described.

25. Apparatus for drawing hollow glass articles comprising a blow-pipe and bait and means to draw it upward, a relatively stationary air-supply pipe telescoped by the blow-pipe and bait and means to cool the air passing therethrough for circulation through the entire article, substantially as described.

26. Apparatus for drawing hollow glass articles comprising a bait and blow-pipe and means to draw the bait upwardly, and a shield surrounding the article having means to retard exterior cooling throughout the major portion of its length, substantially as described.

In testimony whereof, I have hereunto set my hand.

FRANK L. O. WADSWORTH.

Witnesses:
N. M. GRIFFIN,
H. M. CORWIN.